US012132269B2

(12) United States Patent
Huang et al.

(10) Patent No.: US 12,132,269 B2
(45) Date of Patent: Oct. 29, 2024

(54) ANTENNA AND RADIATION UNIT THEREOF, BALUN STRUCTURE OF RADIATION UNIT AND MANUFACTURING METHOD

(71) Applicant: Comba Telecom Technology (Guangzhou) LTD., Guangdong (CN)

(72) Inventors: Liwen Huang, Guangdong (CN); Peitao Liu, Guangdong (CN); Weiwei Jiang, Guangdong (CN); Fei Xiao, Guangdong (CN); Shanqiu Sun, Guangdong (CN); Binlong Bu, Guangdong (CN)

(73) Assignee: COMBA TELECOM TECHNOLOGY (GUANGZHOU) LTD., Guangdong (CN)

( * ) Notice: Subject to any disclaimer, the term of this patent is extended or adjusted under 35 U.S.C. 154(b) by 255 days.

(21) Appl. No.: 17/764,736

(22) PCT Filed: Aug. 18, 2020

(86) PCT No.: PCT/CN2020/109878
§ 371 (c)(1),
(2) Date: Mar. 29, 2022

(87) PCT Pub. No.: WO2021/063122
PCT Pub. Date: Apr. 8, 2021

(65) Prior Publication Data

US 2022/0376394 A1 Nov. 24, 2022

(30) Foreign Application Priority Data

Sep. 30, 2019 (CN) ......................... 201910944449.6

(51) Int. Cl.
*H01Q 5/48* (2015.01)
*H01Q 1/24* (2006.01)
(Continued)

(52) U.S. Cl.
CPC ............... *H01Q 5/48* (2015.01); *H01Q 1/246* (2013.01); *H01Q 1/36* (2013.01); *H01Q 1/50* (2013.01); *H01Q 19/10* (2013.01); *H01Q 21/24* (2013.01)

(58) Field of Classification Search
CPC ............ H01Q 1/246; H01Q 1/36; H01Q 1/50; H01Q 19/10; H01Q 21/24; H01Q 5/48;
(Continued)

(56) References Cited

U.S. PATENT DOCUMENTS 5,532,707 A 7/1996 Klinger et al.
6,037,912 A 3/2000 DeMarre
(Continued)

FOREIGN PATENT DOCUMENTS

CN 112582774 B 5/2002
CN 101425626 A 5/2009
(Continued)

OTHER PUBLICATIONS

Supplementary Search Report dated Apr. 19, 2021 from the Office Action for Chinese Application No. 201911415189.X pp. 2. [see pp. 1-2, categorizing the cited references].
(Continued)

*Primary Examiner* — Thien M Le
(74) *Attorney, Agent, or Firm* — Ladas & Parry, LLP

(57) ABSTRACT

An antenna and radiation unit thereof, and balun structure of radiation unit are disclosed. The radiation unit has two dipoles belonging to a same polarization and two feeding components respectively feeding the two dipoles. One end of each of the two feeding components is electrically connected to its corresponding dipole, and the other end of each of the two feeding components is combined through a same physical combining port inherent in the radiation unit. By arranging a combining port inherent to the radiation unit and
(Continued)

connecting it to a respective end of two feeding components connected to two dipoles of the same polarization, the signals of the two dipoles are divided/combined through the combining port.

17 Claims, 6 Drawing Sheets

(51) Int. Cl.

| | |
|---|---|
| ***H01Q 1/36*** | (2006.01) |
| ***H01Q 1/50*** | (2006.01) |
| ***H01Q 19/10*** | (2006.01) |
| *H01Q 21/24* | (2006.01) |

(58) Field of Classification Search

CPC ........ H01Q 1/12; H01Q 19/108; H01Q 21/06; H01Q 23/00; H01Q 25/001; H01Q 9/26

See application file for complete search history.

(56) References Cited

U.S. PATENT DOCUMENTS

| | | | | |
|---|---|---|---|---|
| 10,290,950 | B1 | 5/2019 | Crocker et al. | |
| 10,424,830 | B2 | 9/2019 | Semonov et al. | |
| 10,468,758 | B1 * | 11/2019 | Ozdemir | H01Q 1/28 |
| 10,644,384 | B1 * | 5/2020 | Ozdemir | H01Q 9/28 |
| 11,476,574 | B1 * | 10/2022 | Abdelmonem | H01Q 21/062 |
| 11,476,585 | B1 * | 10/2022 | Abdelmonem | H01Q 21/26 |
| 2007/0241983 | A1 | 10/2007 | Cao et al. | |
| 2008/0074339 | A1 | 3/2008 | Lee et al. | |
| 2008/0111757 | A1 | 5/2008 | Bisiules et al. | |
| 2008/0174495 | A1 | 7/2008 | Lin et al. | |
| 2010/0117652 | A1 * | 5/2010 | Cork | G01R 33/3453 343/834 |
| 2010/0309084 | A1 | 12/2010 | Bu et al. | |
| 2011/0043424 | A1 * | 2/2011 | Lee | H01Q 25/001 343/816 |
| 2013/0187822 | A1 | 7/2013 | Shi et al. | |
| 2014/0043207 | A1 | 2/2014 | Xie et al. | |
| 2014/0361942 | A1 | 12/2014 | Parsche et al. | |
| 2015/0102971 | A1 | 4/2015 | Liu et al. | |
| 2015/0380826 | A1 * | 12/2015 | Yang | H01Q 5/25 343/846 |
| 2016/0018509 | A1 * | 1/2016 | McCorkle | G01S 5/12 342/386 |
| 2016/0322695 | A1 | 11/2016 | Claeys et al. | |
| 2018/0294550 | A1 * | 10/2018 | Segador Alvarez | H01Q 19/108 |
| 2022/0077600 | A1 * | 3/2022 | Sundararajan | H01Q 21/26 |
| 2022/0123467 | A1 | 4/2022 | Li et al. | |
| 2022/0376394 | A1 | 11/2022 | Huang et al. | |
| 2024/0030623 | A1 * | 1/2024 | Staita | H01Q 21/0006 |

FOREIGN PATENT DOCUMENTS

| | | | |
|---|---|---|---|
| CN | 101707291 | A | 5/2010 |
| CN | 201699136 | U | 1/2011 |
| CN | 102013560 | A | 4/2011 |
| CN | 102171889 | A | 8/2011 |
| CN | 201966321 | U | 9/2011 |
| CN | 102694237 | A | 9/2012 |
| CN | 102723577 | A | 10/2012 |
| CN | 103036073 | A | 4/2013 |
| CN | 202930542 | U | 5/2013 |
| CN | 203103499 | U | 7/2013 |
| CN | 203232955 | U | 10/2013 |
| CN | 103401073 | A | 11/2013 |
| CN | 203850423 | U | 9/2014 |
| CN | 204289687 | U | 4/2015 |
| CN | 104716417 | A | 6/2015 |
| CN | 104900987 | A | 9/2015 |
| CN | 205104602 | U | 3/2016 |
| CN | 205564971 | U | 9/2016 |
| CN | 205646132 | U | 10/2016 |
| CN | 205752490 | U | 11/2016 |
| CN | 106602223 | A | 4/2017 |
| CN | 107910636 | A | 4/2018 |
| CN | 207217765 | U | 4/2018 |
| CN | 108039570 | A | 5/2018 |
| CN | 207303345 | U | 5/2018 |
| CN | 108172978 | A | 6/2018 |
| CN | 108281765 | A | 7/2018 |
| CN | 108417998 | A | 8/2018 |
| CN | 108461904 | A | 8/2018 |
| CN | 108717997 | A | 10/2018 |
| CN | 207977449 | U | 10/2018 |
| CN | 208272119 | U | 12/2018 |
| CN | 109193113 | A | 1/2019 |
| CN | 109326872 | A | 2/2019 |
| CN | 208589522 | U | 3/2019 |
| CN | 109672016 | A | 4/2019 |
| CN | 208782022 | U | 4/2019 |
| CN | 109802234 | A | 5/2019 |
| CN | 209045768 | U | 6/2019 |
| CN | 109980329 | A | 7/2019 |
| CN | 110994179 | A | 4/2020 |
| CN | 111092296 | A | 5/2020 |
| CN | 111180860 | A | 5/2020 |
| EP | 2214260 | A1 | 8/2010 |
| EP | 3361567 | A1 | 8/2018 |
| KR | 20080028003 | A | 3/2008 |
| KR | 20080033660 | A | 4/2008 |
| WO | 2004001902 | A1 | 12/2003 |
| WO | 2007126831 | A2 | 11/2007 |
| WO | 2012113026 | A1 | 8/2012 |

OTHER PUBLICATIONS

Wang, H. et al., “A Novel Low-Profile, Dual-Band, Dual-Polarization Broadband Array Antenna” Journal of Microwaves, Nov. 2006, 1 page, Issue 6. (English Translation of Abstact only).

Chinese Search Report dated Nov. 19, 2020 from the Office Action for Application No. 201911422004.8, 2 pages. [See p. 1-2, categorizing the cited references].

Extended European Search Report including Written Opinion for Application No. 20871575.5 dated Sep. 16. 2022, pp. 1-12.

International Search Report for Application No. PCT/CN2020/109880 mailed Oct. 28, 2020, pp. 1-4.

International Search Report for Application No. PCT/CN20201109881 mailed Nov. 19, 2020, pp. 1-4.

Search Report dated Oct. 17, 2021 from the Office Action for Chinese Application No. 201911415228.6 issued Oct. 25, 2021, 2 pages. [See p. 2, categorizing the cited references].

Search Report dated Sep. 27, 2020 from the Office Action for Chinese Application No. 201911411651.9 issued Oct. 12, 2020, 2 pages. [See p. 1, categorizing the cited references].

Supplementary Search Report dated Dec. 24, 2021 from the Office Action for Chinese Application No. 201911415228.6 issued Jan. 5, 2022, 2 pages. [See p. 1, categorizing the cited references].

International Search Report for Application No. PCT/CN2020/109878 mailed Nov. 26, 2020, pp. 1-4.

* cited by examiner

ANTENNA AND RADIATION UNIT THEREOF, BALUN STRUCTURE OF RADIATION UNIT AND MANUFACTURING METHOD

CROSS-REFERENCE TO RELATED APPLICATION

The present application is a U.S. national entry, filed under 35 U.S.C. § 371 of International Patent Application No. PCT/CN2020/109878, filed on Aug. 18, 2020, which claims the priority of China Patent Application 201910944449.6, filed on Sep. 30, 2019, the disclosure of which is hereby incorporated by reference herein in its entirety.

FIELD OF THE DISCLOSURE

The present application relates to the field of mobile antennas, and in particular, to an antenna and radiation unit thereof, balun structure of radiation unit and manufacturing method.

BACKGROUND

With the development of the communication industry, miniaturized, multi-band and multi-standard base station antennas have increasingly become the mainstream antennas used in the communication industry. In order to improve space utilization, at present, multi-band and multi-standard antennas generally adopt a coaxial nested structure. That is, the high frequency radiation units are embedded in the low frequency radiation units. As shown in FIG. 1*a* and FIG. 1B, in a current base station antenna, a conventional nesting radiation unit 100 is designed to consist of four dipoles 1, which are connected by a combination of a coaxial cable 2 having a length of one or more wavelengths and a power divider 3 into a feeding network of an antenna system. Here, the cable 2 is fixed on a reflector through a cable clip 4. On the one hand, this connection method makes the space layout on the back of the antenna reflector 200 very complicated. On the other hand, because the cable and the power divider are difficult to fix, the intermodulation stability of the antenna system is poor. In the same way, this will certainly not help improve production efficiency.

SUMMARY

A primary object of the present application is to provide a radiation unit that can improve its intermodulation stability.

Another object of the present application is to provide an antenna using the above-mentioned radiation unit.

Yet another object of the present application is to provide a balun structure of radiation unit that can simplify the back space layout of the antenna to improve the intermodulation stability of the antenna.

A further object of the present application is to provide a method for manufacturing the above radiation unit.

In order to achieve the above objects, the application provides the following technical solution:

As a first aspect, the present application relates to a radiation unit having two dipoles belonging to a same polarization and two feeding components respectively feeding the two dipoles. One end of each of the two feeding components is electrically connected to its corresponding dipole, and the other end of each of the two feeding components is combined through a same physical combining port inherent in the radiation unit. The combining port is integrated into a balun structure of the radiation unit to become an inherent part thereof.

Preferably, the dipole has a solid spatial structure supported by the balun structure.

Further, the balun structure has a base and balun arms connected to the base and correspondingly arranged for supporting radiating arms in the dipoles. The combining port is integrally formed on the base.

Preferably, the combining port is arranged on the base at a geometric symmetry axis of the two dipoles.

Preferably, the feeding component is laid from the combining port along a direction in which their corresponding balun arms support the radiating arms.

Preferably, the feeding components is laid along the front or back of the balun arm, and a connection portion of the combining port used for combining is adaptively arranged on the same front or back.

Preferably, the combining port and the dipole are both installed on the same side of the reflector where the radiation unit is located, and thus are regarded as an inherent part of the radiation unit.

Preferably, the dipole is a patch vibrator, and the combining port is placed at an adjacent position that can maintain the electrical performance of the dipole; or, the dipole is a die-cast vibrator.

Preferably, the combining port is pre-set at a corresponding position of the reflector where the radiation unit is located, and thus is regarded as an inherent part of the radiation unit.

Preferably, the distances from a spatial position where the combining port is located to respective feeding points of the two dipoles of a same polarization are approximately equal.

Preferably, the combining port has a cylindrical structure, its outer wall constitutes an outer conductor, and an inner conductor is provided in a through hole defined and formed by the outer wall; the inner conductor of each power feeding component is connected to the inner conductor of the combining port, and the outer conductor of each power feeding component is connected to the outer conductor of the combining port.

Preferably, the feeding component is a coaxial cable, and two of the coaxial cables provided for the same polarization have approximately the same length.

Preferably, the combining port has two corresponding conductive elements, which are respectively used to connect an outer conductor of an external cable with the outer conductor of the feeding component, and to connect an inner conductor of the external cable with the inner conductor of the feeding component.

Preferably, capacitive coupling feature is presented between two conductive elements, corresponding to the inner conductor and the outer conductor, of the combining port.

Furthermore, the radiation unit further includes another polarization arranged to be orthogonal to the aforementioned polarization, the two polarizations have the same structure, and have respective corresponding combining ports and feeding components.

Preferably, the dipoles with two polarizations are all supported on the base through the corresponding balun arms, and the two combining ports are also integrated on the base, each feeding component is laid between the corresponding dipole and the combining port, and is wired along the corresponding balun arm.

Preferably, a position of the combining port corresponding to each polarization at the base corresponds to the bottom of the balun arm supporting another dipole of the other polarization, so that the lengths of the two feeding components combined at the combining port from the combining port to the feeding points of the two dipoles of corresponding polarizations are approximately equal.

Preferably, each of said combining ports is adapted to be electrically directly connected to the phase shifter of the antenna via only a single cable for receiving a signal directly output by the phase shifter and realizing power division through the combining port.

Preferably, the setting of the length of the feeding component and the position of the combining port satisfies the impedance matching condition required for transmitting the corresponding polarized signal via the radiation unit.

Preferably, the length of the feeding component is an integral multiple of 0.5 times a working wavelength of a corresponding polarized signal.

Preferably, the feeding component is a coaxial cable, the outer conductor of which is grounded through the outer conductor of the combining port, and the inner conductor is electrically connected to the external cable through the inner conductor of the combining port.

As a second aspect, the present application also relates to an antenna, comprising a plurality of the radiation units, and a phase-shifting network composed of a plurality of phase-shifters, which is used for outputting a phase-shifted signal that realizes a signal phase differential relationship after being phase-shifted, and feeds the radiation unit, a phase-shifted signal output end of each of the phase shifters being transmitted to a corresponding combining port of a corresponding one of the radiation units through a single cable.

Preferably, the phase shifting network and the cable are located on the back of the reflector of the antenna, and each of the radiation units is fixed on the front of the reflector with a three-point support structure.

Preferably, the radiation unit is a low-frequency radiation unit for radiating low-frequency signals, and a high-frequency radiation unit for radiating high-frequency signals is installed within the range enclosed by the dipoles of the radiation unit.

As a third aspect, the present application also relates to a radiation unit balun structure, which includes a base and at least a pair of balun arms, each pair of balun arms having two symmetrical sets of balun arms, each set of balun arms being equidistantly arranged around the circumference of the base, and a combining port being integrally formed with the base, the combining port including an outer conductor formed by an outer wall of a through hole defined in the base, and an inner conductor embedded and fixed in the through hole, the end of each set of balun arms being used to fix the dipole of the radiation unit, and the main body of each set of balun arms being used to wire the feeding component arranged and connected between the dipole and the combining port.

Preferably, a combining port corresponding to a same pair of balun arms is located so that the two dipoles supported by the pair of balun arms are fed by the corresponding feeding components to achieve impedance matching feeding.

Preferably, when there are two pairs of balun arms, a combining port corresponding to one pair of balun arms is just located at a position of the base corresponding to the other pair of balun arms.

As a fourth aspect, the present application also relates to a method for manufacturing a radiation unit, comprising the following steps: preparing a mold for forming a balun structure of a radiation unit as mentioned above; casting a blank of the radiation unit; de-molding to remove the shaped blank of the radiation unit; and installing a medium wrapped an inner conductor in a through hole of an outer conductor.

Compared with the traditional technology, the solution of the present application has the following advantages:

The radiation unit of the present application realizes the signal combining of the feeding components of the two dipoles belonging to the same polarization through its inherent combining port. When it is used in an antenna, only a coaxial cable is needed to connect between the combining port and the phase shifter, and the feeding network can feed the radiation unit with a polarization. Compared with the traditional antenna that is connected between the radiation unit and the phase shifter through two cables to realize the feeding of two dipoles of the same polarization, it helps to reduce a large number of cables, and it can also reduce the number of cables on the back side of the antenna reflector, so that the layout of the back of the reflector is simpler. It also reduces the use of coaxial cables, helping to save costs and reduce the weight of the antenna.

In the antenna of the present application, as the feeding components (such as coaxial cables) of the radiation unit feeding two dipoles of the same polarization are combined through a combining port, compared with the traditional one consisting of a reflector, a radiation unit, a phase shifter, a power divider, a coaxial cable connecting the phase shifter and the power divider, and a coaxial cable connecting the power divider and the radiation unit, and three or more cable clips, it does not require the arrangement of additional power dividers, thus reducing the length of the coaxial cable, helping reducing costs and making the layout of the back of the antenna simpler.

Additional aspects and advantages of the present application will be set forth in part in the following description, which will become apparent from the following description, or may be learned by practice of the present application.

BRIEF DESCRIPTION OF THE DRAWINGS

The above and/or additional aspects and advantages of the present application will become apparent and readily understood from the following description of embodiments taken in conjunction with the accompanying drawings, wherein.

DETAILED DESCRIPTION

Figure 1A:
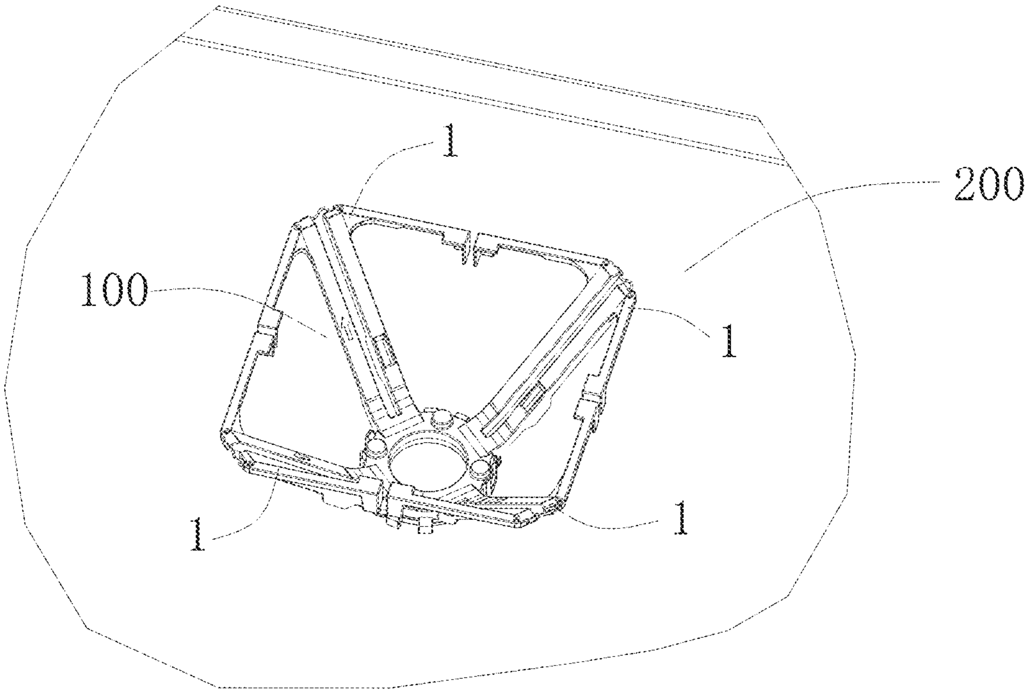
FIG. 1*a* is a perspective view of a conventional antenna, showing the connection relationship between the radiation unit and the reflector.

The following describes in detail the embodiments of the present application, examples of which are illustrated in the accompanying drawings, wherein the same or similar reference numerals refer to the same or similar elements or elements having the same or similar functions throughout the description. The embodiments described below with reference to the accompanying drawings are exemplary and are only used to explain the present application, but not to be construed as a limitation on the present application.

The present application relates to an antenna, which includes a reflector, a radiation unit disposed on the front of the reflector, and a feeding network including a plurality of phase shifters disposed on the back of the reflector. The feeding network includes a phase-shifting network composed of the plurality of phase shifters, which is used for outputting a phase-shifted signal that realizes a signal phase differential relationship after being phase-shifted, and feeds the radiation unit.

Wherein, the radiation unit includes a low-frequency radiation unit for radiating low-frequency signals and/or a high-frequency radiation unit for radiating high-frequency signals. It can be at least one low-frequency radiation unit array, at least one high-frequency radiation unit array, an array of at least one low-frequency array and at least one high-frequency array adjacent to the at least one low-frequency array, an array of two adjacent low-frequency radiation units with a high-frequency radiation unit disposed therebetween and preferably with a high frequency radiation unit nested within a low frequency radiation unit, an array of multiple different and/or identical high frequency arrays in which any low frequency radiation array is disposed, and the so on. Specifically, it can be set by technical personnel according to system performance requirements, such as gain requirements.

The radiation unit has two dipoles in a same polarization direction and two feeding components for feeding the two dipoles respectively. One end of each of the two feeding components is electrically connected to its corresponding dipole, and the other end thereof is combined through a same physical combining port inherent in the radiation unit.

In one embodiment, the radiation unit is preferably a dual polarized radiation unit. The radiation unit has two dipoles in each polarization direction and two feeding components that feed the two dipoles of the same polarization, respectively. One end of each of the two feeding components is electrically connected to its corresponding dipole, and the other end thereof is combined through a same physical combining port inherent in the radiation unit.

Here, the so-called physical combining port means that the combining port has a physical structure, and more specifically, it has a coupling structure for cable connection. The combining port can realize combining of at least two signals. In addition, the combining port belongs to the structure of the radiation unit, and the combining port can be integrally formed or integrated with the main body of the radiation unit to achieve an integrated structure. When the main body of the radiation unit is attached to the reflector, it can also be joined to the combining port previously fixed on the reflector to form an inherent part of the radiation unit.

Here, for a die-cast vibrator, the main body includes a dipole and a balun structure. In this type of vibrator, the dipole has a spatial solid structure different from the printing formation and is supported by the balun structure. The balun structure generally includes a balun arm, and the feeding component can be laid along a main body of the balun arm and connected with the dipole. If necessary, the balun structure also includes a base for connecting a plurality of balun arms to form a whole. A plurality of balun arms is equally spaced around the circumference of the base. For a patch vibrator, the main body includes a dipole.

Here, for the die-cast vibrator, the combining port is connected to the base, or the combining port is directly fixed to the balun arm. Preferably, the combining port and the base or the balun arm are integrally formed. In other manners, the combining port can also be formed separately from the balun arm or the base. For the patch vibrator, the combining port can be pre-fixed at a designated position on the reflector, and is electrically connected to the dipole of the vibrator when the vibrator is installed on the reflector. When the patch vibrator is further supported by a metal support structure, the combining port can be connected to the metal support structure. Here, since the feeding component of the combining port and the patch vibrator are located on a same side of the reflector, the combining port is regarded as a part of the radiation unit.

The length of each feeding component has a matching relationship with a position where the combining port is set. The matching relationship between the two satisfies the impedance matching condition required to transmit its corresponding polarized signal via the radiation unit.

Further, in a specific example, when the feeding component is a 75-ohm coaxial cable, its length is an integer multiple of 0.5 times the working wavelength of a corresponding polarized signal. Preferably, the lengths of the two feeding components feeding the two dipoles of the same polarization are approximately equal. Specifically, the distances from the spatial position of the combining port to the respective feeding points of the two dipoles of the same polarization can be made approximately equal, thereby facilitating the setting of the feeding components and improving the consistency of the radiation units. It should be noted that the lengths of the two feeding components may not be strictly equal, and may be adjusted according to the cross-polarization ratio or the setting of other electrical properties On the one hand, the length of the cable can be adjusted, and on the other hand, the setting position of the combining port can be adjusted.

Preferably, the combining port is arranged on the base at a geometric symmetry axis of the two dipoles. For example, the combining port corresponding to one pair of balun arms is just located at the position on the base corresponding to the other pair of balun arms.

Preferably, the combining port has a corresponding conductive element for connecting an outer conductor of an outer cable with an outer conductor of the feeding component, and connecting an inner conductor of the outer cable and an inner conductor of the feeding component. In addition, there is a capacitive coupling feature between the two conductive elements of the combining port corresponding to the inner conductor and the outer conductor.

In one embodiment, the combining port has a cylindrical structure, its outer wall constitutes an outer conductor, and an inner conductor is provided in a through hole defined and formed by the outer wall. The inner conductor of each power feeding component is connected to the inner conductor of the combining port, and the outer conductor of each power feeding component is connected to the outer conductor of the combining port.

In this application, the phase-shifted signal output end of each phase shifter is transmitted to a corresponding combining port of a corresponding radiation unit through a separate cable (e.g., a coaxial cable). As the respective ends of the two feeding components feeding the two dipoles of the same polarization are combined and connected to the combining port, each polarization of the radiation unit can be directly connected between the combining port and the phase shifter of the feeding network through only one coaxial cable, thus, the feeding of the two dipoles of the same polarization by the feeding network is completed. Compared with the traditional antenna, based on impedance matching, two long coaxial cables need to be extended through each polarization to connect to the same port of the phase shifter, reducing one coaxial cable. For a pair of antennas composed of multiple dual-polarized radiation units, a large number of coaxial cables are reduced, so that the layout of the back side of the reflector is greatly optimized, and the back side of the reflector is more concise.

Preferably, the feeding component is laid along the front or back of the balun arm, and the connection portion of the combining port used for combining is adaptively arranged on the same front or back. When the combining port is provided on the base, it may protrude from the front of the base, or may not protrude from the front of the base, depending on the convenience of wiring.

Figure 2:
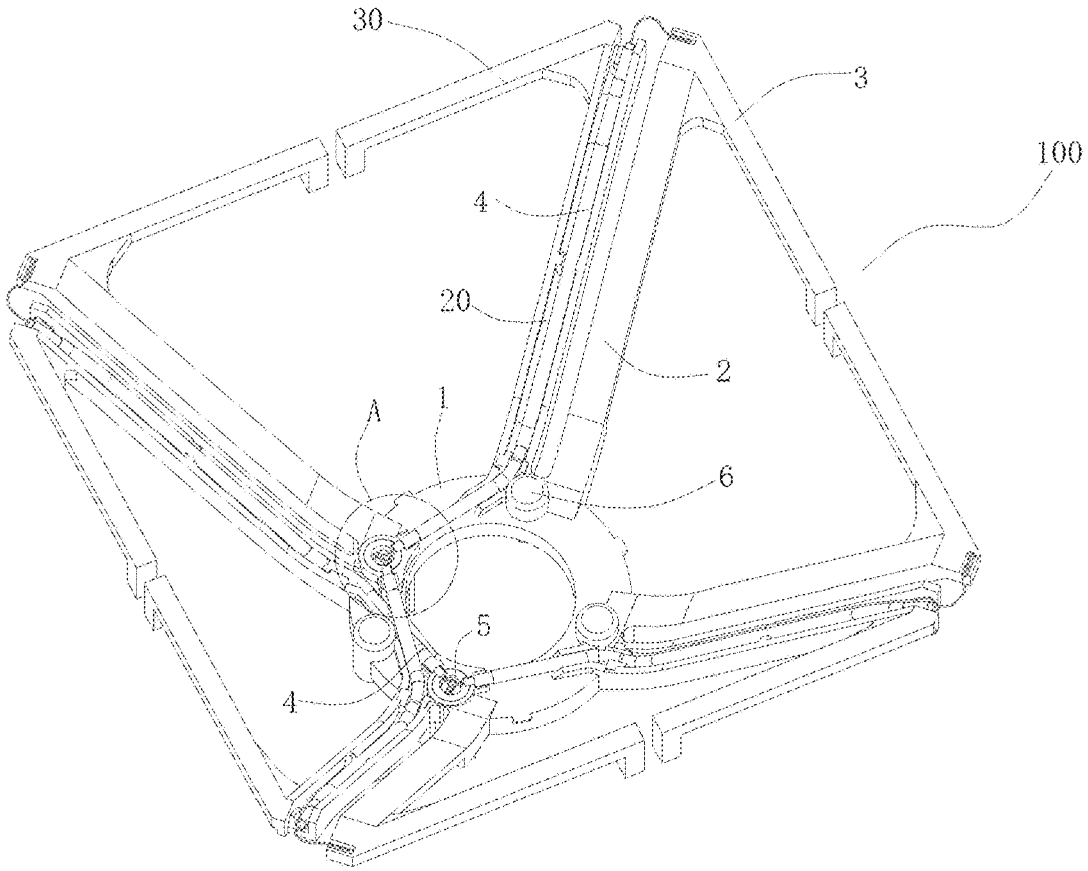
FIG. 2 is a perspective view of a radiation unit according to an embodiment of the present application.

The structure of the radiation unit of the present application, the principles involved, and the effects brought about by the die-cast vibrator are described below by taking the die-cast vibrator as an example. Referring to FIG. 2, a radiation unit 100 includes an annular base 1, two pairs of balun arms 2 extending upwardly and outwardly from the front of the base 1, four dipoles 3 a respective one of which is connected to an end of a corresponding balun arm 2 away from the base 1, a feeding component connected to and feeding a corresponding dipole 3, and a combining port 5 arranged below the base 1. Wherein, each pair of balun arms 2 includes two sets of balun arms, and each set of balun arms includes two symmetrically arranged balun arms for supporting two radiating arms of a dipole. The feeding component is a coaxial cable 4.

The four dipoles 3 are divided into two pairs, each pair of dipoles 3 works in the same polarization direction, and is supported on a pair of balun arms. Preferably, the two pairs of dipoles 3 work in two mutually orthogonal polarization directions, for example, two polarization directions are +45° polarization direction and −45° polarization direction, or perpendicular polarizations. Each dipole 3 includes two radiating arms 30, and the radiating arms 30 are linear, so that the four dipoles 3 together define a regular quadrilateral. Please refer to FIG. 5, in another embodiment, the radiation arms 30 are arc-shaped, so that the four dipoles 3 jointly define a circle.

Preferably, there are two coaxial cables 4 corresponding to two dipoles 3 located in each polarization direction. One end of each of the two coaxial cables 4 is connected to a corresponding dipole 3, and the other end thereof is connected to a corresponding combining port. Moreover, the parallel impedance of the two coaxial cables at the combining port 5 is a specific impedance, for example, 50 ohms, so as to match the output impedance of the feeding network. When the coaxial cable 4 as the feeding component is a 75-ohm coaxial cable, its length is an integral multiple of half wavelength. And when the coaxial cable 4 is a 100-ohm coaxial cable, the parallel impedance of the two coaxial cables at the combining port is 50 ohms, so the length can be any length, which can be set by technicians according to actual needs.

As the impedance at the combining port 5 is 50 ohms, which matches the output impedance of the antenna feeding network, it is no longer necessary to set a corresponding length of coaxial cable between the combining port 5 and the phase shifter for impedance matching, thereby reducing the length of the coaxial cable.

Preferably, the length of the coaxial cable 4 as the feeding component is an integral multiple of half the working wavelength, and the principle of its length design is: the output impedance of the feeding network of the conventional base station antenna is 50 ohms, and most of the conventional dipoles 3 are composed of half-wave vibrators. The ideal impedance of the half-wave vibrator is about 75 ohms. In order to match the dipole 3 with the feeding network in the base station antenna, the output impedance of the combining port 5 of the radiation unit 100 of the present application must be 50 ohms. For example, in one embodiment, in order to realize that the output impedance of the combining port 5 is 50 ohms, by connecting two coaxial cables with an integral multiple of half wavelength (0.5λ) and an impedance of 75 ohms in parallel at the combining port 5, two dipoles 3 with the same polarization direction are realized to have an impedance of 50 ohms. In order to achieve balanced feeding, the length of the balun arm 2 of the conventional radiation unit 100 is mostly a quarter wavelength (ie 0.25λ), while the dielectric constant of the coaxial cable is generally 2.01, and the coaxial cable of half wavelength is generally has a length of $L=0.5\lambda/\sqrt{2.01}\approx 0.24\lambda$. Preferably, the length of the coaxial cable of the present application along the balun arm 2 is 0.25λ, and the length along the annular base 1 is about 0.1λ, and the length of the coaxial cable as the feeding component just meets the minimum impedance matching length.

Figure 1B:
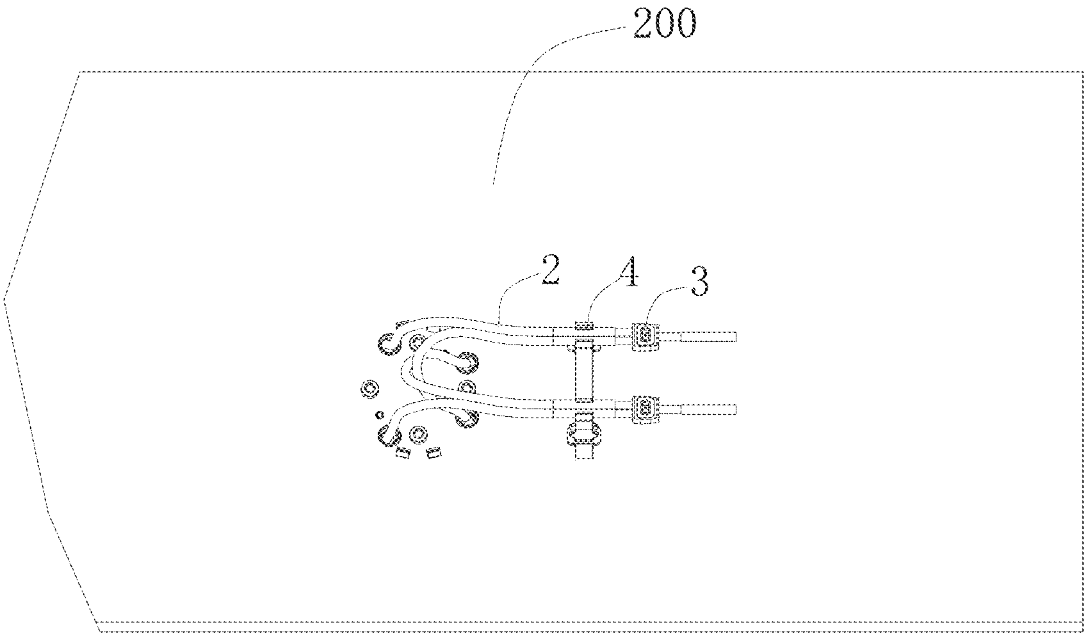
FIG. 1B is a perspective view of the antenna shown in FIG. 1*a* from another perspective, showing the structure of the backside of the reflector.

In the conventional radiation unit 100, as shown in FIGS. 1*a* and 1*b*, 200 is a reflector, 100 is the conventional radiation unit 100 installed on the front of the reflector, and 2 is a coaxial cable connected to the radiation unit 100 on the back of the reflector. It can be seen from FIG. 1B that the coaxial cable connected to the four dipoles 1 of the conventional radiation unit 100 needs to pass through the reflector 200 to connect the power divider 3. In this figure, the power divider 3 adopts a one-to-two connection terminal, and other power division methods such as PCB power divider can also be used. If the length of the coaxial cable 2 of the traditional radiation unit 100 is half a wavelength, the cable length is not enough to pass through the reflector to connect the power divider, so the length of the coaxial cable of the traditional radiation unit 100 must be one wavelength or longer. It can be seen that, compared with the conventional radiation unit 100, the radiation unit 100 of this embodiment has the optimal length of the coaxial cable, which greatly saves the cost of the cable, and has better impedance matching performance.

Figure 3:
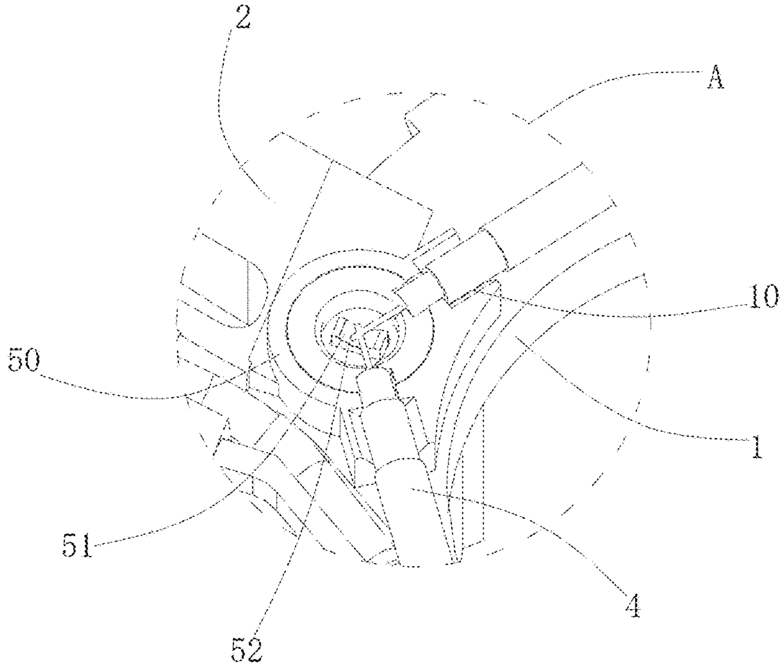
FIG. 3 is an enlarged view of part A in FIG. 2.

Please refer to FIG. 3, preferably, the combining port 5 has a cylindrical structure, its outer wall constitutes an outer conductor 50, and an inner conductor 51 is provided in a through hole defined by the outer wall. An insulating medium is filled between the outer conductor 50 and the inner conductor 51, so that the inner conductor 51 is fixed in the through hole of the outer conductor 50. In this embodiment, the combining port constitutes a structure similar to a coaxial cable, the inner conductors of the two feeding components belonging to the same polarization are connected to the inner conductor 51 of the combining port 5, and the outer conductors of the power feeding components are connected to the outer conductor 50 of the combining port 5. In addition, in other embodiments, the combining port has two corresponding conductive elements, which are respectively used to connect an outer conductor of an external cable with the outer conductor of the feeding component, and to connect an inner conductor of the external cable with the inner conductor of the feeding component. Capacitive coupling feature is presented between two conductive elements, corresponding to the inner conductor and the outer conductor, of the combining port. In this embodiment, the cross-section of the combining port is circular, and in other embodiments, the combining port may also be a polygon. The combining port is implemented as a cylindrical structure, which is convenient to connect with a coaxial cable as an external cable.

The outer wall (i.e., the outer conductor) of the combining port 5 can be integrally formed during the die-casting process of the main body of the radiation unit, and then the medium wrapped the inner conductor is placed in the through hole of the outer conductor, thus forming the combining port.

Because the two coaxial cables 4 connected to the two dipoles 3 in the same polarization direction are combined and connected to a combining port 5, the feeding of the four dipoles 3, the four dipoles 3 in the two polarization directions can be connected to the phase shifter through two coaxial cables via the two combining ports 5, and then connected to the feeding network, thereby reducing the number of coaxial cables. On the one hand, when the radiation unit 100 is applied to an antenna, only two cable-through holes need to be opened on the reflector, so that the two combining ports 5 can pass through the cable-through holes and are connected to the phase shifter of the feeding network through the cable-through holes. Compared with the traditional antenna that needs to open four cable-through holes, the number of cable-through holes is reduced by half, which can greatly reduce the problem of poor intermodulation stability due to burrs in the cable-through holes. On the other hand, the number of coaxial cables connected between the radiation unit and the phase shifter can be reduced, so that the number of cables on the back of the reflector can be reduced, and the layout of the back of the reflector can be greatly optimized and become concise.

Preferably, the distances between the feeding portion 52 of the combining port 5 and the two dipoles 3 located in the same polarization direction are equal, so that the lengths of the two coaxial cables 4 are equal, for example, both are half wavelengths, so as to facilitate impedance matching and facilitate the wiring of the coaxial cable 4 on the balun arm 2 and the base 1. It should be understood that the lengths of the two coaxial cables 4 can also be approximately equal or adjusted according to actual needs due to processing errors or the need for impedance matching and cross-polarization ratio adjustment.

Further, the base 1 is provided with a welding groove 10 at a position close to the combining port 5, and the welding groove 10 can be used for clamping and welding the outer conductor of the coaxial cable 4. In order to facilitate the welding of the two coaxial cables 4 having the same polarization direction, the two welding grooves 10 are provided at each combining port 5, and the two welding grooves 10 are generally arranged in the shape of an "A".

Preferably, in order to facilitate the wiring of the coaxial cable 4, the front or back of the balun arm 2 is provided with a wiring groove 20. The coaxial cable 4 is placed in the wiring groove 20 and welded with the wiring groove 20. The connecting part (not marked, the same below) of the combining port 5 for combining is adaptively arranged on the same front or back.

Figure 4:
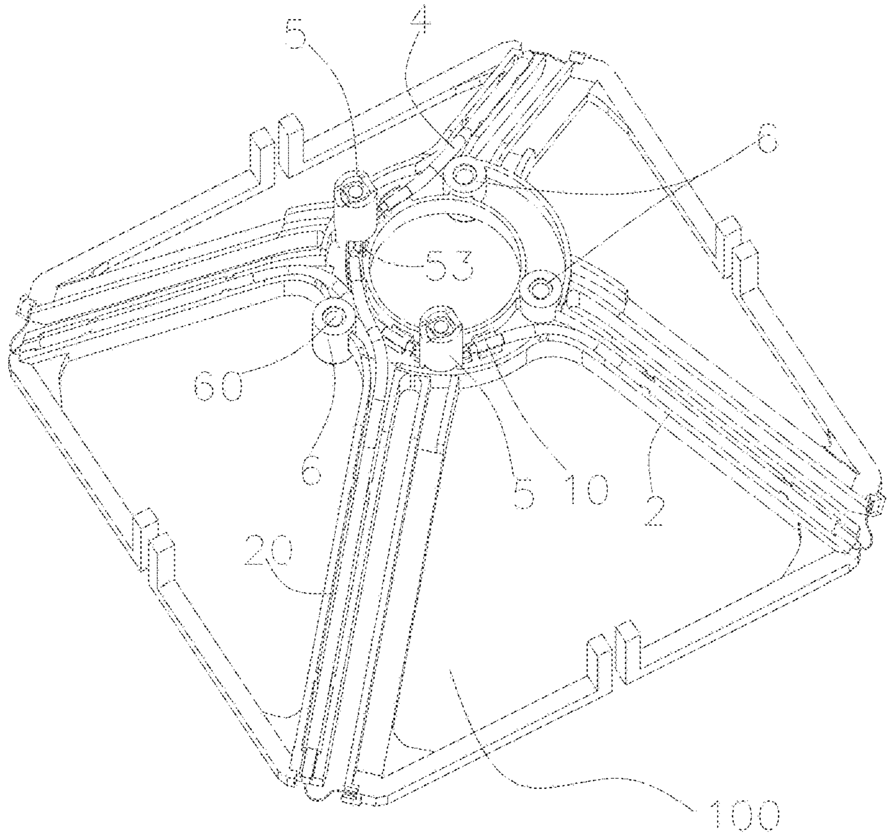
FIG. 4 is a perspective view of a radiation unit according to another embodiment of the present application.

Referring to FIG. 2, in one embodiment, the wiring groove 20 is opened on the front of the balun arm 2. At this time, the combining port 5 passes through the base 1 so that the coaxial cable 4 on the front of the balun arm 2 is connected to the combining port 5 and the feeding network. Referring to FIG. 4, in another embodiment, the wiring groove 20 is opened on the back of the balun arm 2. Correspondingly, the combining port 5 is arranged on the back of the base, and the side wall of the outer conductor 50 of the combining port 5 close to the wiring groove 20 is provided with a relief hole 53 for the inner conductor of the coaxial cable 4 to be received therein and then be connected to the inner conductor 51 of the combining port 5.

Figure 5:
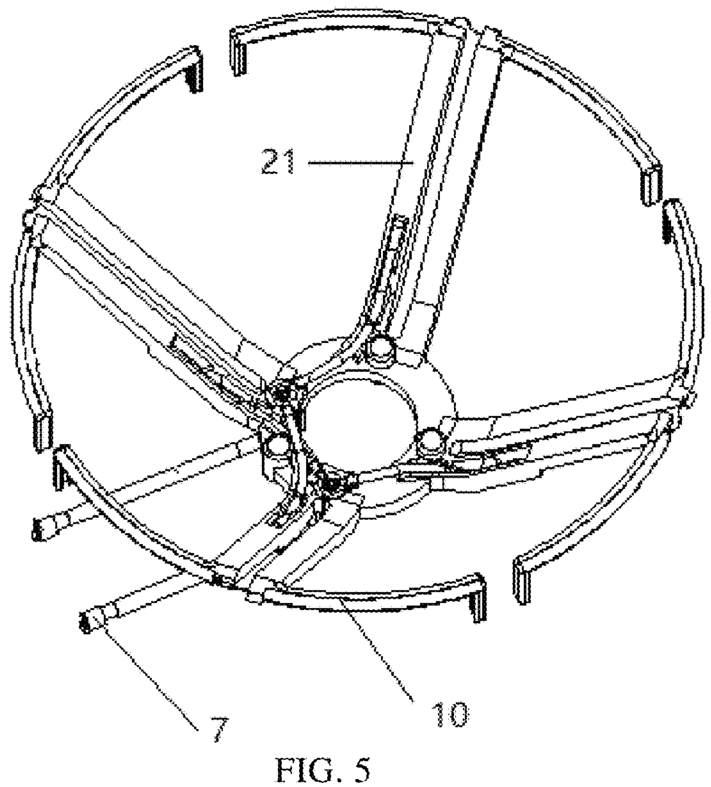
FIG. 5 is a perspective view of a radiation unit according to yet another embodiment of the present application.

Referring to FIG. 5, preferably, the balun arm 2 is provided with a sealing plate 21 which is connected with the opposite sides of the wiring groove 20, so as to wrap the coaxial cable 4 in the balun arm 2. This can not only protect the coaxial cable 4, but also achieve a certain aesthetic effect.

Preferably, three fixing columns 6 for fixing the radiation unit 100 to the reflector are evenly distributed on the base 1. The fixing column 6 is provided with a threaded hole 60 penetrating a lower end surface of the base 1, so as to be connected with the threaded hole 60 of the fixing column 6 by a screw passing through the threaded hole on the reflector, thus realizing the fixing of the radiation unit 100 and the reflector. In this embodiment, a triangular fixing structure is defined by said three fixing columns 6 which are evenly distributed on the base. Compared with the traditional quadrilateral fixing structure, one fixing column 6 can be reduced, and the fixing structure is firmer, saving materials and reducing weight. Correspondingly, the number of threaded holes on the reflector 200 can be reduced, and the factor of intermodulation instability caused by the presence of burrs in the holes can be reduced.

Moreover, the radiation unit 100 further includes a filter branch, and the filter branch includes a short-circuit terminal 7 that is electrically connected to the combining port 5 through a coaxial cable. By arranging the short-circuit terminal 7 electrically connected to the combining port 5 to form a filtering branch, the problem of mutual coupling between different frequency bands of the multi-band and multi-system antennas can be effectively reduced. The length of the cable between the short-circuit terminal and the combining port 5 is preferably ¼ wavelength.

In other embodiments, the main body of the radiation unit may also only include dipoles and balun arms for supporting the dipoles respectively. The balun arm is directly fixed to the reflector when the radiation unit is mounted on the reflector. In this embodiment, the combining port is fixed to the balun arm.

Figure 6:
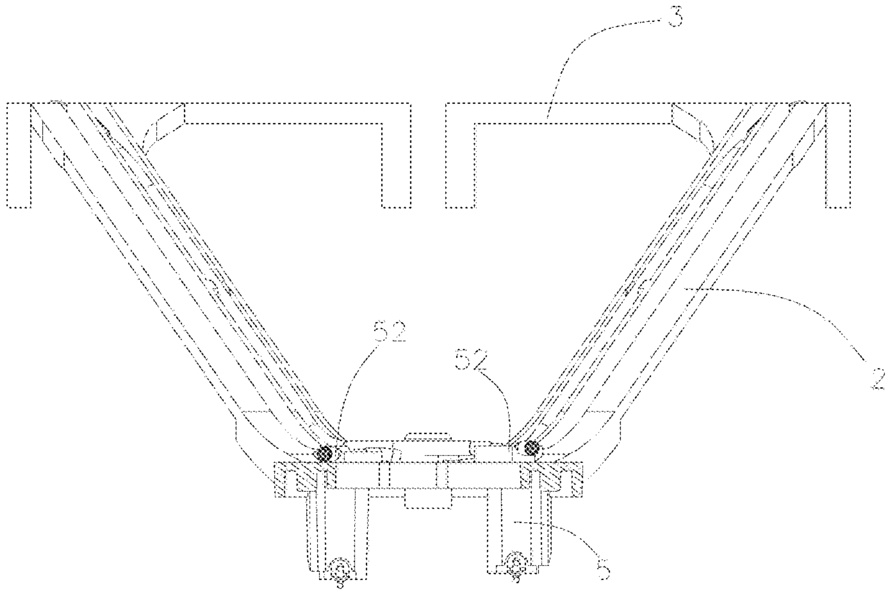
FIG. 6 is a cross-sectional view of a radiation unit according to an embodiment of the present application.
Figure 7:
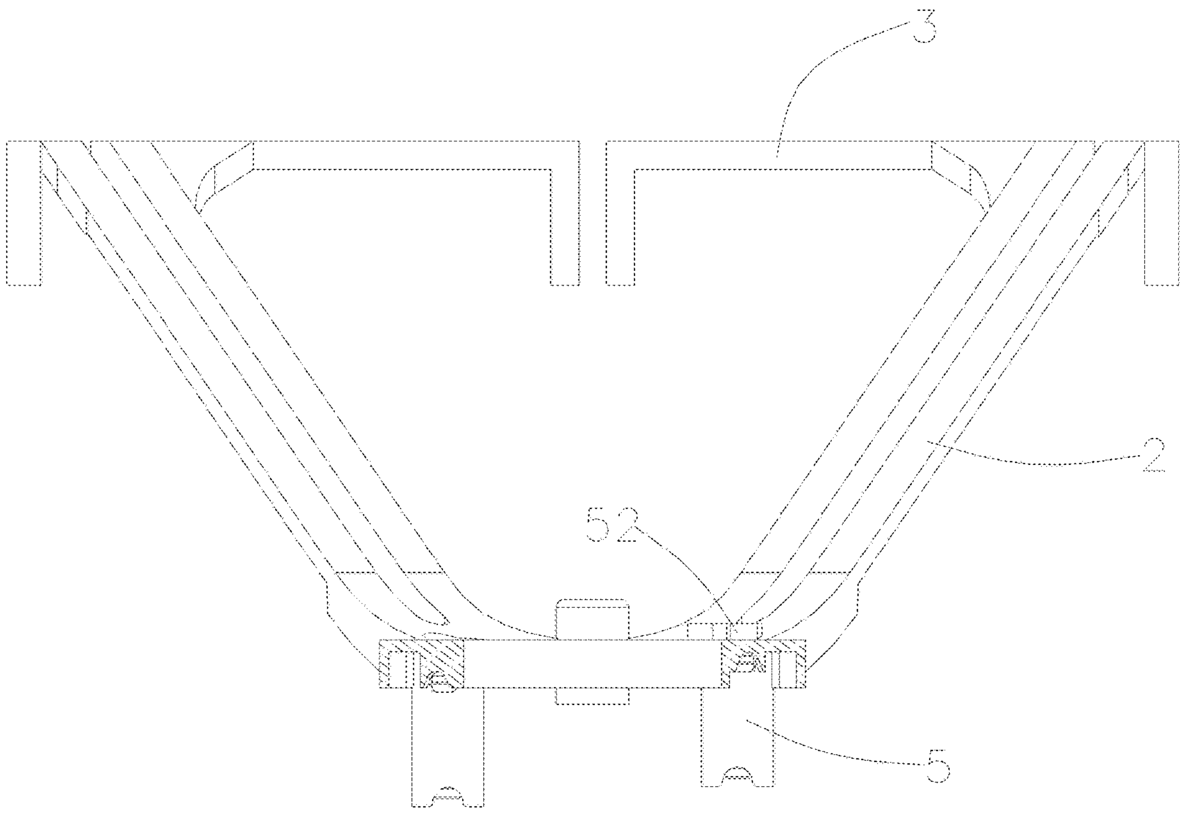
FIG. 7 is a cross-sectional view of a radiation unit according to another embodiment of the present application.

Please refer to FIG. 6. Preferably, the lengths of the two combining ports 5 corresponding to the two polarizations are the same. In order to facilitate the laying of the coaxial cable 4 as the feeding component, the feeding portions 52 of the two combining ports 5 exposed on the front of the base 1 are arranged at different heights, so as to facilitate the welding of the coaxial cable and the combining ports. In addition, referring to FIG. 7, the feeding portion 52 of the combining port 5 may not be exposed on the front of the base.

In the above embodiments, the structure of the radiation unit is illustrated by the die-cast vibrator, which does not mean that the radiation unit of the present application is only a die-cast vibrator, and it may also be a patch vibrator. The combining port is placed in an adjacent location that maintains the electrical performance of the dipole.

Figure 8A:
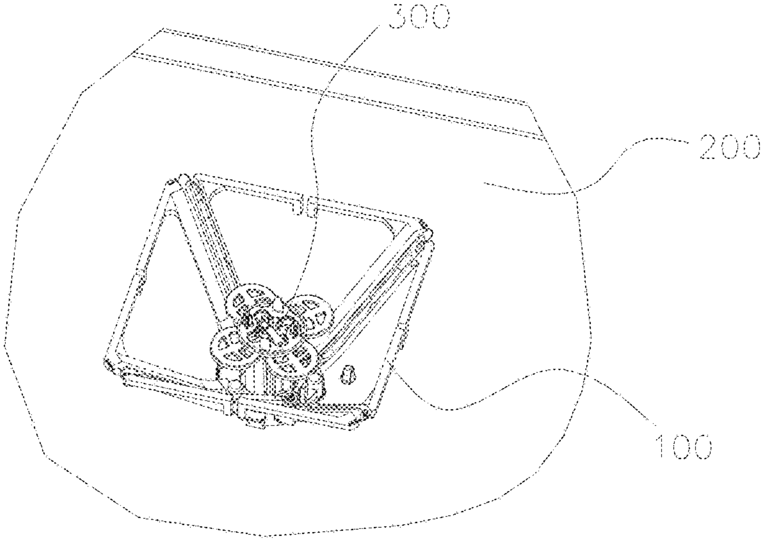
FIG. 8*a* is a perspective view of an antenna according to an embodiment of the present application, showing the structure of a reflector from a front view.
Figure 8B:
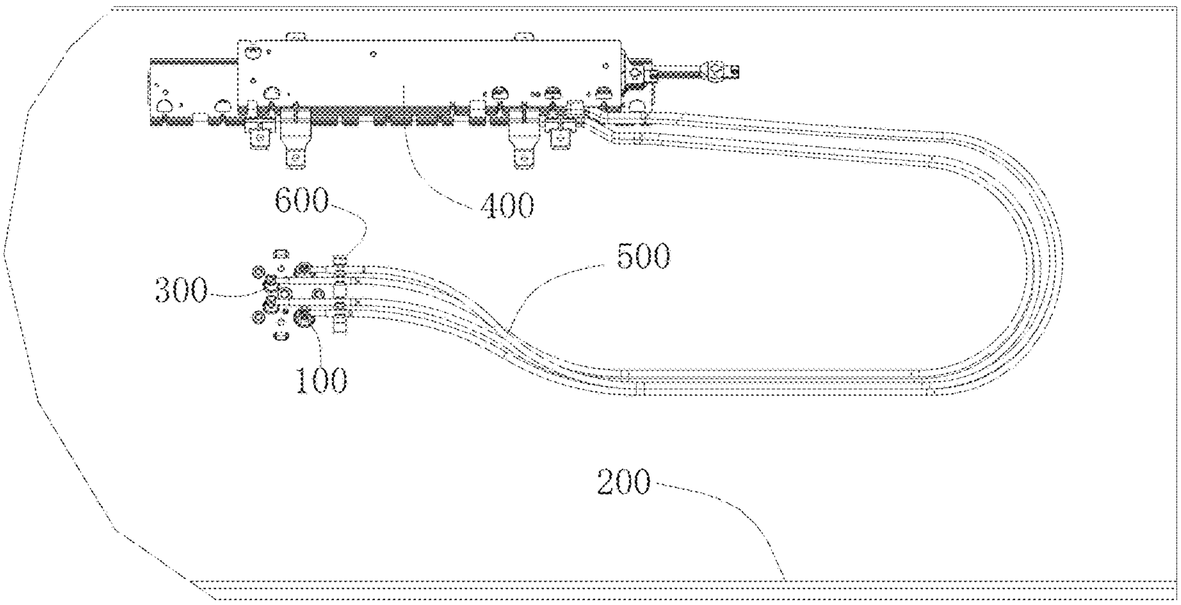
FIG. 8*b* is a perspective view of the antenna shown in FIG. 8*a* from another perspective, showing the structure of the reflector from a rear perspective.

Referring to FIGS. 8 *a* and 8 *b*, as a second aspect, the antenna provided by the present application includes a reflector 200, the above-mentioned radiation unit 100 disposed on the front of the reflector 200, and a feeding network provided on the back of the reflector 200 and including a phase shifter 400. The reflector 200 is provided with a cable-through hole, and each of the combining ports is only connected to a signal output port of the phase shifter through a coaxial cable after passing through the cable-through hole. The above radiation unit 100 includes a low frequency radiation unit for radiating low frequency signals and a high frequency radiation unit 300 for radiating high frequency signals. Part of the high frequency radiation unit 300 is nested in the low frequency radiation unit to realize a dual-frequency antenna design. The radiation unit and the phase shifter 400 are connected by a coaxial cable 500, so that the radiation unit can be connected to a feeding network for feeding it. The coaxial cable is fixed on the reflector 200 by a cable clip 600.

The cable clip 600 has two clamping portions (not shown), which are distributed along the width direction of the reflector, and can correspondingly clamp two coaxial cables respectively connected to the low-frequency radiation unit and the high-frequency radiation unit. Compared to traditional antennas, the number of clips can be reduced.

It is well known that in a secondary base station antenna, signal coverage is often provided by multiple radiation units. Using the antenna formed by the radiation units of the present application, since each radiation unit can reduce the number, length and cable clips of coaxial cables, the layout of the antenna on the back of the reflector becomes quite simple, and the weight of the antenna is reduced. Since there is no need to set up a separate power divider, the connection between the radiation unit, the phase shifter and the reflector is relatively stable, which is beneficial to improve the stability of intermodulation. In addition, for each radiation unit, only two cable-through holes need to be opened on the reflector for the insertion and installation of the feeder, and only three fixing holes need to be opened for fixing the radiation unit, which greatly reduces the number of holes opened on the reflector, and reduces the problem of poor intermodulation caused by burrs in the holes.

Figure 9:
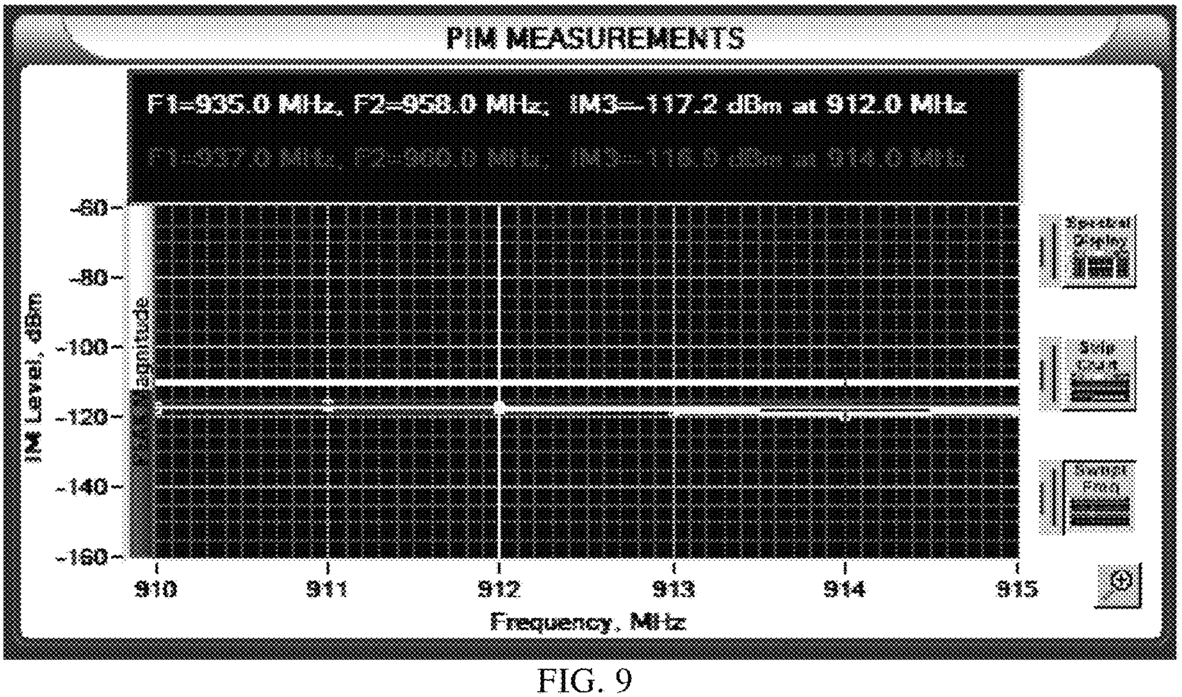
FIG. 9 is an actual measurement diagram of the conventional antenna intermodulation.
Figure 10:
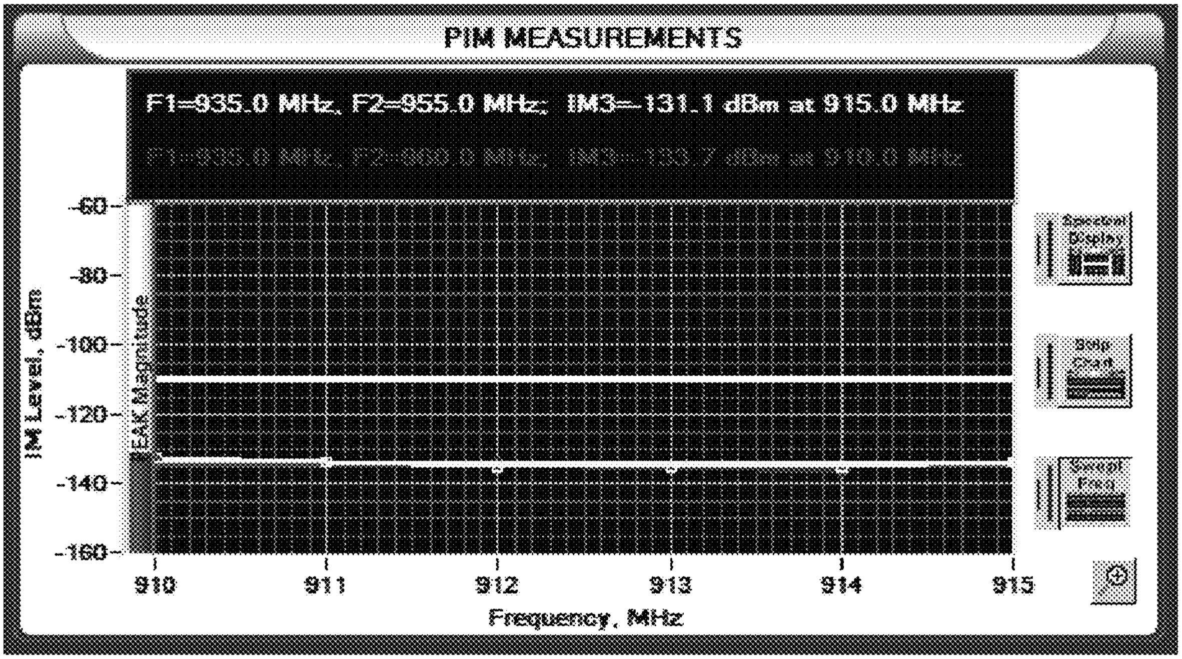
FIG. 10 is an actual measurement diagram of the intermodulation of the antenna of the present embodiment.

The measured intermodulation data of the antenna of this application is shown in FIG. 10, and its worst value is −131.1 dBm. The measured data of the traditional base station antenna intermodulation is shown in FIG. 9, and its worst value is −116.9 dBm. It can be seen from the figures that the intermodulation of the antenna of the present application has been significantly improved.

The above are only part of the embodiments of the present application. It should be pointed out that for those skilled in the art, without departing from the principles of the present application, several improvements and modifications can also be made. It should be regarded as the protection scope of this application.

The invention claimed is:

1. A radiation unit, comprising two dipoles belonging to a same polarization and two feeding components respectively feeding the two dipoles, wherein one end of each of the two feeding components is electrically connected to its corresponding dipole, and the other end of each of the two feeding components is combined through a same physical combining port inherent in the radiation unit;

wherein the combining port has a coupling structure for connecting to outer cables;

wherein the combining port is integrated into a base or balun arms of a balun structure of the radiation unit to become an inherent part thereof.

2. The radiation unit as recited in claim 1, wherein the dipole has a solid spatial structure supported by the balun structure.

3. The radiation unit as recited in claim 1, wherein the balun structure has the base and the balun arms connected to the base and correspondingly arranged for supporting radiating arms in the dipoles, and the combining port is integrally formed on the base.

4. The radiation unit as recited in claim 1, wherein the combining port is arranged on the base at a geometric symmetry axis of the two dipoles.

5. The radiation unit as recited in claim 1, wherein the distances from a spatial position where the combining port is located to respective feeding points of the two dipoles of a same polarization are approximately equal.

6. The radiation unit as recited in claim 1, wherein the combining port has a cylindrical structure, its outer wall constitutes an outer conductor, and an inner conductor is provided in a through hole defined and formed by the outer wall; the inner conductor of each power feeding component is connected to the inner conductor of the combining port, and the outer conductor of each power feeding component is connected to the outer conductor of the combining port.

7. The radiation unit as recited in claim 6, wherein the feeding component is a coaxial cable, and two of the coaxial cables provided for the same polarization have approximately the same length.

8. The radiation unit as recited in claim 1, wherein the combining port has two corresponding conductive elements, which are respectively used to connect an outer conductor of an external cable with the outer conductor of the feeding component, and to connect an inner conductor of the external cable with the inner conductor of the feeding component.

9. The radiation unit as recited in claim 8, wherein capacitive coupling feature is presented between two conductive elements, corresponding to the inner conductor and the outer conductor, of the combining port.

10. The radiation unit as recited in claim 1, wherein the radiation unit further includes another polarization arranged to be orthogonal to the aforementioned polarization, the two polarizations have the same structure, and have respective corresponding combining ports and feeding components.

11. The radiation unit as recited in claim 10, wherein the dipoles with two polarizations are all supported on the base through the corresponding balun arms, and the two combining ports are also integrated on the base, each feeding component is laid between the corresponding dipole and the combining port, and is wired along the corresponding balun arm.

12. The radiation unit as recited in claim 11, wherein a position of the combining port corresponding to each polarization at the base corresponds to the bottom of the balun arm supporting another dipole of the other polarization, so that the lengths of the two feeding components combined at the combining port from the combining port to the feeding points of the two dipoles of corresponding polarizations are approximately equal.

13. The radiation unit as recited in claim 1, wherein the length of the feeding component is an integral multiple of 0.5 times a working wavelength of a corresponding polarized signal.

14. The radiation unit as recited in claim 1, wherein the feeding component is a coaxial cable, the outer conductor of which is grounded through the outer conductor of the combining port, and the inner conductor is electrically connected to the external cable through the inner conductor of the combining port.

15. An antenna, comprising a plurality of radiation units according to claim 1, and a phase-shifting network composed of a plurality of phase-shifters, which is used for outputting a phase-shifted signal that realizes a signal phase differential relationship after being phase-shifted, and feeds the radiation unit, a phase-shifted signal output end of each of the phase shifters being transmitted to a corresponding combining port of a corresponding one of the radiation units through a single cable.

16. The antenna as recited in claim 15, wherein the phase-shifting network and the cable reside on the back of the reflector of the antenna.

17. A balun structure of a radiation unit, comprising a base and at least a pair of balun arms, each pair of balun arms having two symmetrical sets of balun arms, each set of balun arms being equidistantly arranged around the circumference of the base, and a combining port being integrally formed with the base, the combining port including an outer conductor formed by an outer wall of a through hole defined in the base, and an inner conductor embedded and fixed in the through hole, the end of each set of balun arms being used to fix the dipole of the radiation unit, and the main body of each set of balun arms being used to wire the feeding component arranged and connected between the dipole and the combining port.

* * * * *